United States Patent
Ciet et al.

(10) Patent No.: US 8,175,266 B2
(45) Date of Patent: May 8, 2012

(54) SYSTEM AND METHOD OF PERFORMING AUTHENTICATION

(75) Inventors: Mathieu Ciet, Paris (FR); Augustin Farrugia, Cupertino, CA (US); Jean-Francois Riendeau, Santa Clara, CA (US); Nicholas T. Sullivan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1024 days.

(21) Appl. No.: 12/116,819

(22) Filed: May 7, 2008

(65) Prior Publication Data
US 2009/0279696 A1 Nov. 12, 2009

(51) Int. Cl.
*H04L 29/06* (2006.01)
(52) U.S. Cl. ............ 380/37; 380/29; 713/168; 713/169; 713/170; 713/181
(58) Field of Classification Search .................. 713/170; 380/37
See application file for complete search history.

(56) References Cited

U.S. PATENT DOCUMENTS

| 7,305,084 B2 * | 12/2007 | Hawkes et al. ............... 380/37 |
| 2006/0285684 A1 * | 12/2006 | Rogaway ...................... 380/37 |
| 2007/0162958 A1 * | 7/2007 | Kao et al. ...................... 726/4 |

OTHER PUBLICATIONS

Rogaway, "Proposal to NIST for a parallelizable message authentication code," Apr. 1, 2001.*

* cited by examiner

*Primary Examiner* — Taghi Arani
*Assistant Examiner* — Thaddeus Plecha
(74) *Attorney, Agent, or Firm* — Novak Druce + Quigg LLP

(57) ABSTRACT

Disclosed herein are systems, method and computer readable medium for providing authentication of an entity B by an entity A. In the method, entity A selects a value p, a range [a, b] and a granularity epsilon. Entity A sends p, [a, b], and epsilon to entity B. Entity B initializes a value $y_B=0$ and for each x in {a, a+epsilon, . . . , b−epsilon, b} and computes $z=E(x)*x$. The function $E(x)$ is an encryption scheme and the multiplication is carried out mod p. Entity B updates $y_B=y_B+z$. After processing each x, entity B sends $y_B$ to entity A. Entity A performs the same calculation and generates a $y_A$ value and compares $y_A$ with $y_B$. If $y_B=y_A$, Entity A authenticate entity B. In one aspect, a light HMAC scheme splits an input x into n blocks with key expansion.

11 Claims, 12 Drawing Sheets

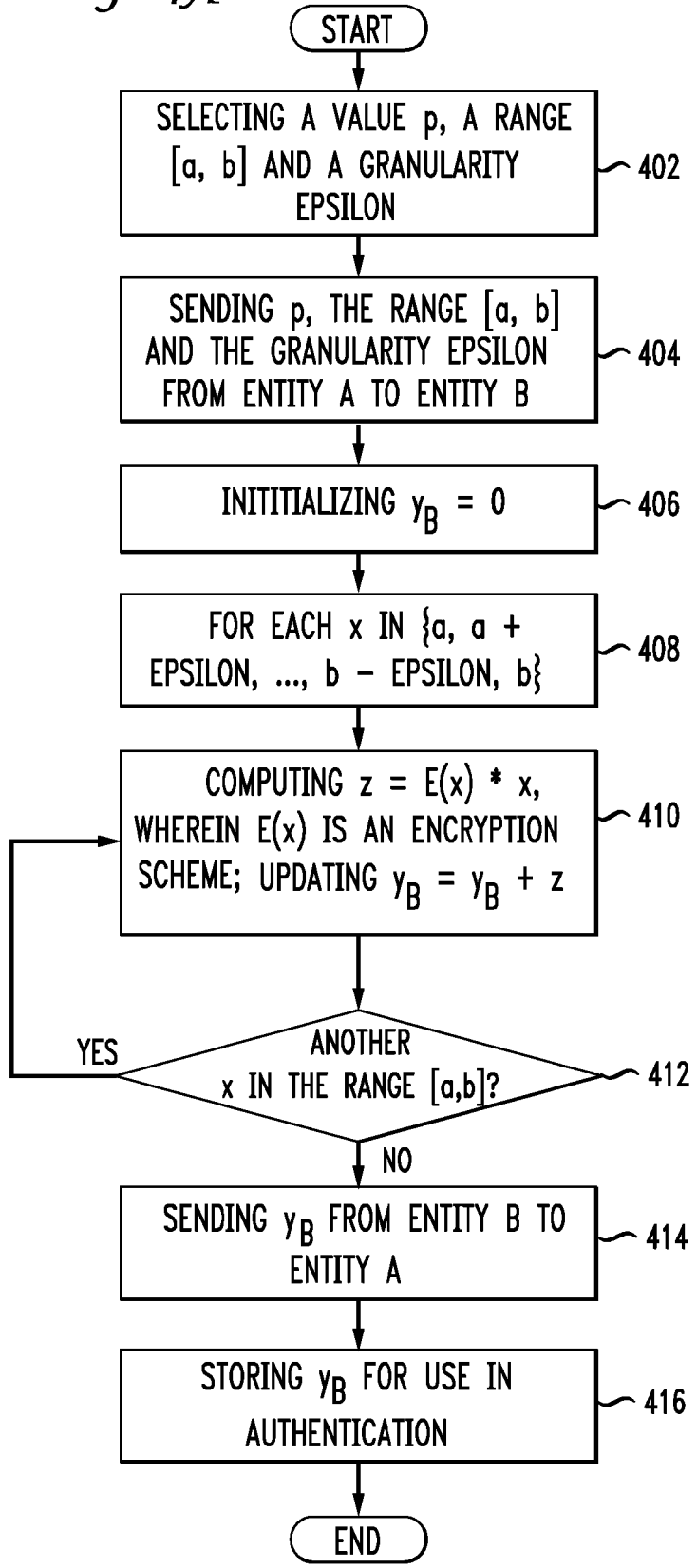

SYSTEM AND METHOD OF PERFORMING AUTHENTICATION

BACKGROUND OF THE INVENTION

1. Field of the Invention

The present invention relates to authentication and more specifically relates to a system and method of providing authentication based on a weighted average principal.

2. Introduction

Protection of digital content transferred between entities over a network is a principal element of computer security. Computer security includes protection of digital content from theft or corruption and also addresses the preservation of system availability. Authentication plays an important role in computer security. Authentication is the process of verifying the digital identity of the sender of a communication. Once an entity has been authenticated, data transfer between the two entities may begin.

Authentication systems provide differing levels of functionality. At a minimum, they allow a recipient to verify that a message originated from a particular user, program or computer. More powerful systems can ensure that messages cannot be copied and replayed in the future, prove to a third party that a message originated with a particular user (non-repudiation), or require multiple users to validate a message.

Authentication is often used in conjunction with cryptography. Cryptography is the traditional method of protecting data. Cryptography protects communications between two mutually trusting parties from thievery or hackers by attack on the data in transit. Encryption is the process of obscuring information in a systematic way, using an algorithm. Decryption is process of removing the protection and retrieving the original data. Encryption and decryption use a key, which is the shared secret that both parties must have. To ensure data integrity, only the authorized parties should hold the secret key.

In many communication systems, the weakest link in security is not the encrypted data but rather cryptographic key management and handling. Unauthorized users may gain access to sensitive data when key management is not performed securely.

Many processes for authenticating an entity have been proposed. Typically, a sender sends a message and both the sender and receiver use the message and a shared secret key to generate a signature. If the signatures are the same, the entity is accepted as authentic in a symmetric encryption scheme. If an asymmetric scheme is used, the system verifies the signature is valid since only the originator of the signature should be able to create that signature.

A system can be compromised when patterns in the signature can be detected and used to surmise and exploit the authentication process. Attacking such encryption schemes requires the collection of a set of the input and the output. Typically, encryption schemes are used to authenticate by encrypting a value. If both the sender and receiver generate the same value, authentication is achieved. What is needed in the art, however, is an improved authentication process that is less susceptible to hacking.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, method and computer readable media related to authentication. In order to address the possible attacks on an encryption scheme by collecting a set of the input and output, an aspect of the present disclosure renders it more difficult to collect such input and output values since generating those values involves a more complicated process. In one exemplary embodiment enables an entity A to authenticate an entity B. The method includes, at entity A: selecting a value p, a range [a, b] and a granularity epsilon. The value p is preferably a power of 2 but may depend on other powers as well. Entity A sends p, the range [a, b] and the granularity epsilon to an entity B. At entity B, the method includes initializing $y_B0$ and for each x in a set {a, a+epsilon, . . . , b−epsilon, b}, performing the following steps: computing $z=E(x)*x$, wherein $E(x)$ is an encryption scheme (the multiplication is carried out mod p), and updating $y_B=y_B+z$. In one embodiment, the $E(x)$ is the proposed HMAC scheme disclosed herein. Entity B then transmits $y_B$ to entity A. Entity A then uses the same calculation to generate a $y_A$ value. The value $y_A$ is compared with the value $y_B$ and if they are determined to be equal, entity A accepts entity B as authentic.

In a variation on the method set forth above, entity B may not receive the granularity epsilon but may generate the value and then perform similar steps as set forth above using the locally generated granularity epsilon. The basis upon which entity B generates the granularity epsilon may vary. The granularity epsilon may be predetermined instead of generated.

The principle discussed above regarding sending or sharing a set {$a_i$} may be extended using a polynomial principle. In the "polynomial principle" aspect of the disclosed scheme, P is the result calculated by both parties. Here, let P equal a sum $a_i*x^i$ over i. The values of the set {$x_i$} are sent from entity A to entity as above. The set of values {$a_i$} is preferably defined a priori and communicated to each of entity A and entity B. The value P, the sum $a_i*x^i$ over i (for each x in the set), may be transmitted from entity A or calculated locally at entity B. In this case, the value of P represents either $y_A$ or $y_B$ depending on what entity performed the calculation. Under this approach, no encryption may be performed in the authentication process.

We next return to the scenario where encryption is used. Entity A sends a set of values {$x_i$} and the value p to entity B. Entity B computes a result based on the set {$a_i$} and $E(x_i)$, wherein $E(x_i)$ represents an encryption scheme or a hash MAC scheme and multiplication is carried out mod p. A value $y_B$ is set to equal the calculated result and entity B transmits $y_B$ to entity A. Entity A performs the same computation to calculate a $y_A$ value which is compared with the generated $y_B$ to determine whether to accept entity B as authentic.

Because of the increased security gained by using the improved key management scheme above, a classical encryption scheme or a less secure encryption scheme may be used without a reduction in overall security. Another embodiment of this disclosure proposes a new "light" hash message authentication code (HMAC) scheme which can be viewed as a less secure approach that can be used in connection with the improved authentication process disclosed herein. The disclosed "light" HMAC scheme may also stand independent of the particular authentication scheme as a separate embodiment.

The HMAC is a type of message authentication code that is calculated using a specific algorithm involving a cryptographic hash function in combination with a secret key. For further background information on HMAC, see the publication of the specifications for The Keyed-Hash Message Authentication Code (HMAC), 2002 Mar. 6, Federal Information Processing Standards Publication 198, incorporated herein by reference. This embodiment provides an alternate approach in which an HMAC is created based on an encryption scheme. A component of the light HMAC scheme is the implementation of a function R as disclosed herein. In this aspect, the method includes splitting an input x into n number of $x_i$ blocks, initializing an input key RK[0]=k and initializing y=0. The method includes performing key expansion by, for i=1 to L, computing round keys as RK[i]=R(RK[i−1]). An updated y is generated as follows: for i=0 to (n−1), setting y=y XOR xi. For j=0 to L−1: computing y=R(y) and setting y=y XOR RK[j] and setting y=R(y). The computed value of y is output and used for in authentication.

Steps that may be involved in the key expansion process include performing a function $g_i$ that concatenates members of a first set of bits and XORs the concatenated members with a constant to generate a second set of bits, performing a function Gi that compresses the second set of bits from $g_i$ and generates a compressed output and XORing the compressed output with the first set of bits to generate a respective round key. Multiple iterative application of the function $g_i$ can be performed.

Other aspects of the disclosure as found herein also include a black box approach in which a particular embodiment involves processing as viewed by an entity A or an entity B separately.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 4A illustrates a method embodiment;

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
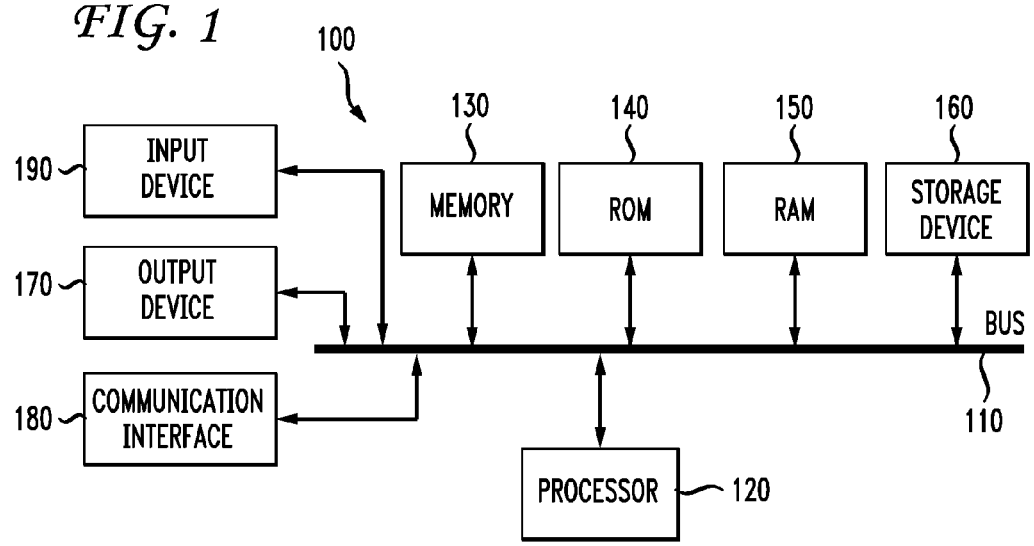
FIG. 1 illustrates a basic system embodiment of the invention.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, a phone or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided. The fundamentality of software components programmed to control or utilize hardware components such as a processor and a display may be termed modules that are configured to perform any of the functionality disclosed herein. Such modules are considered hardware components in that they require functionality that is connected to or controlling at least one hardware component.

Figure 2:
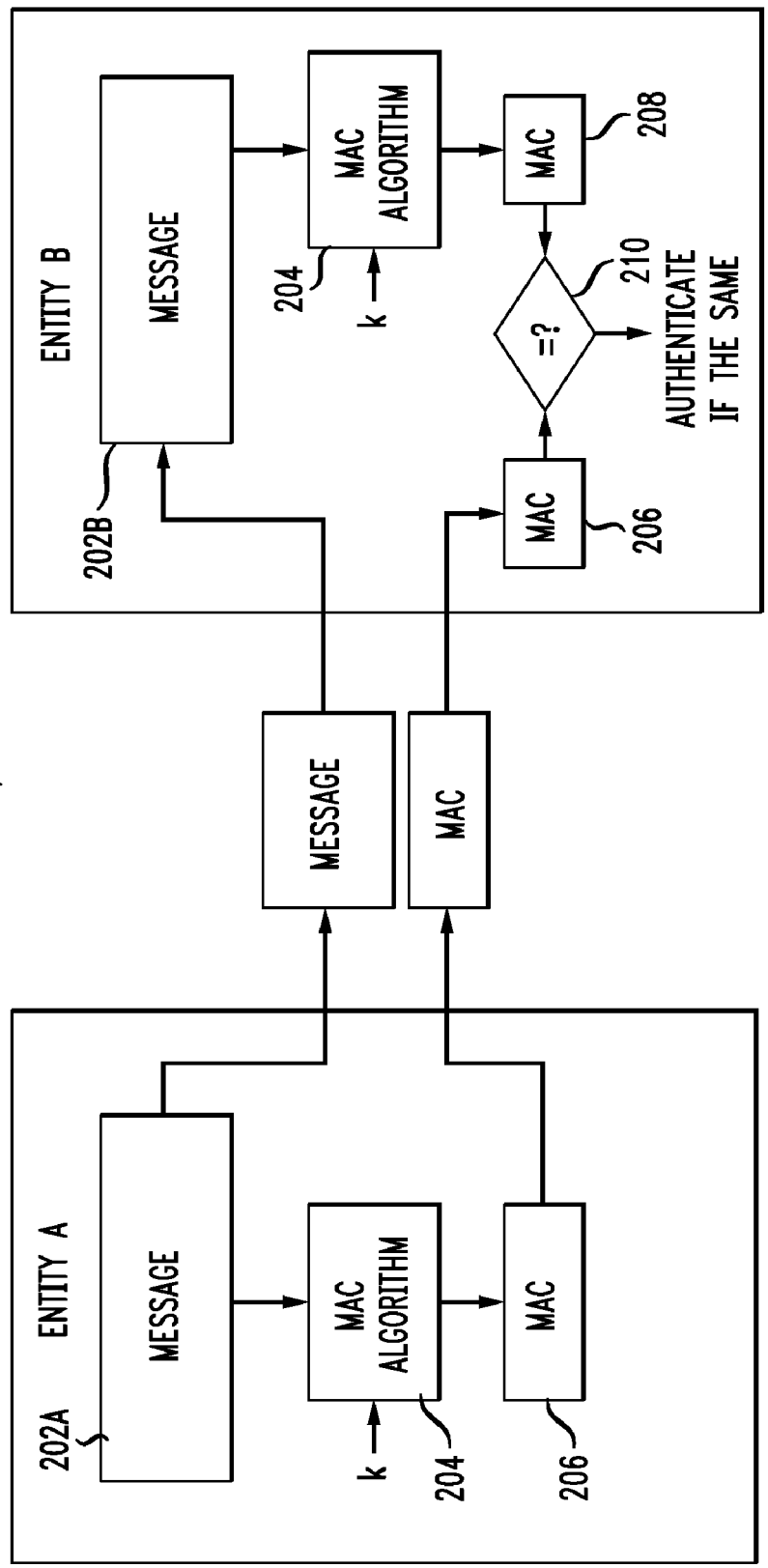
FIG. 2 illustrates a prior art approach using a message authentication code.

FIG. 2 illustrates a prior art cryptographic method authentication code (MAC). This is simply a shorten piece of information that is used to authenticate a message. As shown, an environment 200 involving an entity A has a message 202a that is to be delivered to entity B. Entity B receives the message 202b and needs to authenticate the message. Entity A utilizes a key k that is used to perform a MAC algorithm 204 that generates the MAC code 206. The message and the MAC are transmitted to entity B. Entity B receives the message and utilizes the same key k to process the message through a similar MAC algorithm 204 to generate MAC 208. An authentication mechanism 210 determines if MAC 206 equals MAC 208. If so, authentication is confirmed.

Figure 3:
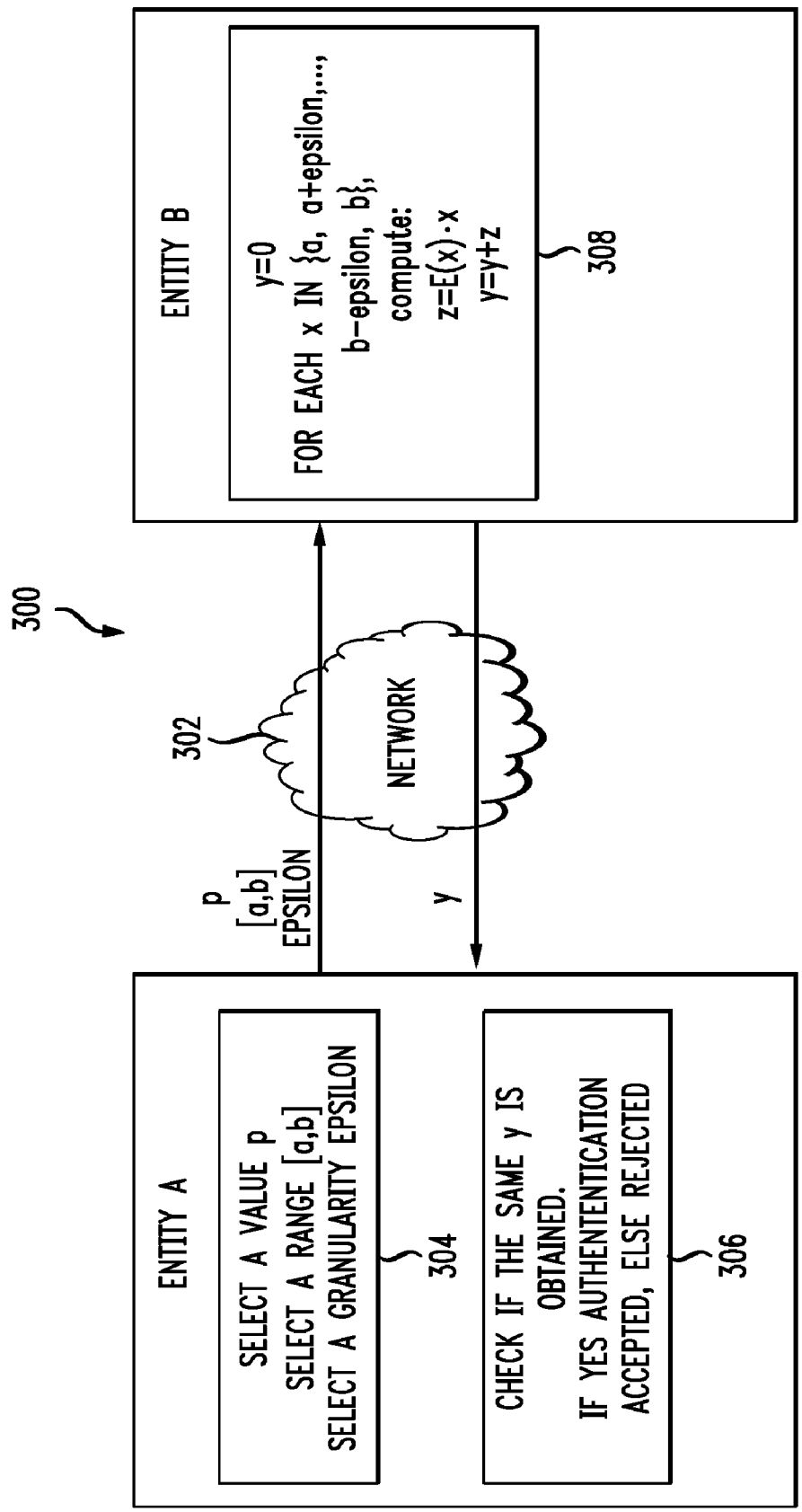
FIG. 3 illustrates basic example processing and communication between an entity A and an entity B.

Disclosed herein is an authentication function that is generally based on a weighted average principle. The disclosure herein may be used as a modification of a classical encryption scheme using something similar to a weighted area defined by a curve from any classical algorithm. FIG. 3 illustrates a general arrangement 300 according to the disclosure. As is mentioned above relative to FIG. 2, a cryptographic message authentication code (MAC) is a piece of information that may be used to authenticate a message. For example, using the diagram shown in FIG. 2, a prior art approach would be to utilize an encryption scheme 204 that works on data in a range $R=[0, \ldots, 2^{(L-1)}]$. The range of input is understood to be the same as the range of output. In other words, R is a defined as a bijection having the certain property that for each x in a set X, there is a function f(x) that maps to a value y in the set Y. With this understanding of the range of input, encryption schemes are typically used to authenticate by encrypting a challenge. Once the encryption is calculated on a receiving side, the receiving system determines if the encrypted value matches the value sent by the sender. A match proves that the key k is available on both sides where the encryption has been done, but the key has not been revealed. It is easier for a hacker to break one encryption than the proposed multiple encryption approach.

The present invention addresses the issue of a need for an improved authentication and key management approach. This disclosure addresses the possible attacks on an encryption scheme by collecting a set of the input and output. The proposed scheme renders it more difficult to collect such input and output values since generating these values involves a more complicated process. Rather than doing only one encryption, the present invention defines a scheme where entity A needs to authenticate B and where an iterative process is applied. FIG. 3 illustrates an environment 300 in which entity A and entity B communicate via a network 302. The network may be the internet, a LAN, a wireless network, or any other type of communication network known or hereinafter developed. In this example, entity A needs to authenticate entity B. The authentication may relate to a value that is used to define the device used by entity B, a person, a message, and so forth. In other words, the authentication may relate to any number of particular entities which are desirable to authenticate. FIG. 3 will also be discussed in connection with the method disclosed in FIG. 4A.

In this example, entity A performs several functions. In block 304, entity A selects a value p, which is preferably a power of 2 but may be other values as well, selects a range [a, b] and a granularity epsilon (402). The granularity epsilon is used to define at entity B what values in the range [a, b] will be used in its calculations. For example, if the range is [0, 10] and the granularity epsilon is 2, then the values used at entity B will be 0, 2, 4, 6, 8, 10. Entity A transmits p, the range [a, b] and the granularity epsilon to entity B (404). Next, entity B performs multiple encryptions. Here, as shown in block 308, entity B initializes $y_B$ as 0 (406) and for each x in the set {a, a+epsilon, . . . , b−epsilon, b} (408), entity B computes z=E(x)*x, wherein E(x) is an encryption scheme or an HMAC scheme and the multiplication is carried out mod p. In one aspect, E(x) is the "light" HMAC scheme disclosed herein. Entity B updates $y_B=y_B+Z$ (410). After iterating through each x in the set (412), entity B transmits $y_B$ from entity B to entity A (414). The value $Y_B$ is stored in one or more locations and is used for authentication (416). In one aspect, the range and the granularity epsilon may be relatively small.

One mechanism by which $y_B$ may be used in authentication is wherein entity A calculates a $y_A$ value by initializing $y_A=0$ and for each x in {a, a+epsilon, . . . , b−epsilon, b}, computing z=E(x)*x, wherein E(x) is an encryption scheme or a hashing mac scheme (the multiplication is carried out mod p), and updates $y_A=y_A+z$. After iteratively following through the process for each x in the set, a $y_A$ is generated that is then compared to the $y_B$ for authentication. This approach provides a more complex authentication process wherein rather than doing a single encryption calculation, multiple encryption calculations are performed to generate y value used for authentication. Ultimately, if $y_B=y_A$, entity B is accepted as authentic. Under the principles disclosed herein, the encryption scheme may be any encryption scheme such as the known AES, DES, or HMAC. Any other encryption scheme may be used in the authentication process.

Figure 4B:
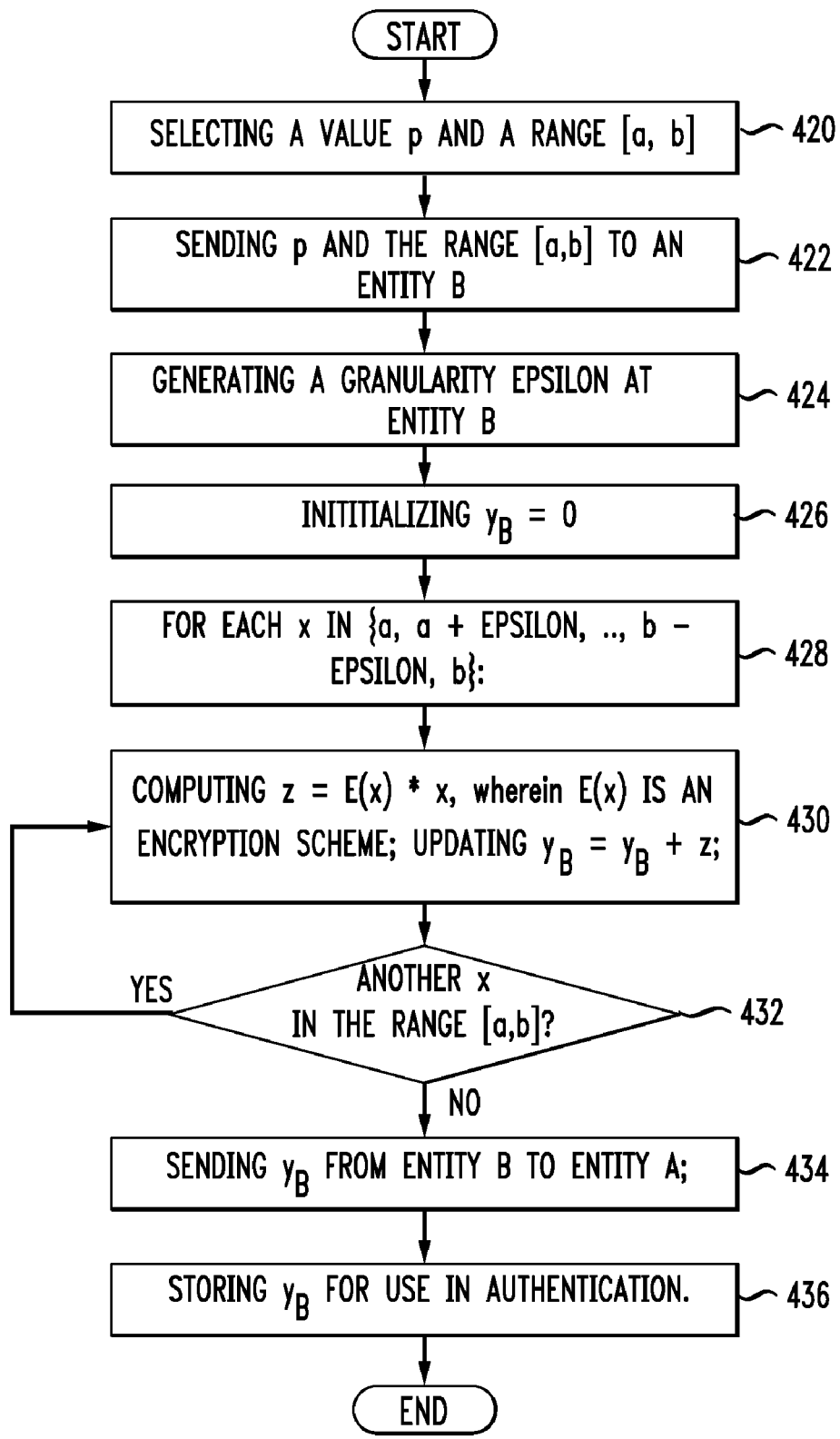
FIG. 4B illustrates a method embodiment.

FIG. 4B illustrates an alternate embodiment also which will be discussed in connection with FIG. 3. Here, entity A selects a value p and a range [a, b] (420) and sends p and the range [a, b] to entity B (422). The difference in this embodiment from the previous embodiment is that entity B selects a granularity epsilon (424). In one aspect, the granularity epsilon in this embodiment as well as in the previous embodiment may be a constant like the number 2. Entity B may select the granularity based on a property associated with the range [a, b]. For example, the granularity epsilon may be selected based on how large the range is relative to some other value. The granularity epsilon may be selected to be large or small relative to the provided range. The granularity epsilon may be selected based on a requirement that the E(x) for any x is uniformly distributed over the range [a, b]. For example, a random x may be selected from the range and an evaluation of E(x) may be performed. The resulting granularity epsilon may be selected based on the evaluation.

In another aspect, the granularity epsilon can be selected by an equation or be used in connection with an equation. These equations can be used to render the selection of values x from the range [a, b] more complex or dynamic. Furthermore, entity B may select a granularity epsilon or implement an equation based on some other factor such as a coordinated time or some other physical value that may be retrieved independently from entity A and entity B. These variations could provide increased security in the authentication process.

Next, entity B initializes $y_B$ as 0 (426) and for each x in {a, a+epsilon, . . . , b−epsilon, b} (428). The value $y_B$ may be initialized to any other value as well besides zero. Entity B computes z=E(x)*x, wherein E(x) is an encryption scheme (the multiplication is carried out mod p), and updates $y_B=y_B+z$ (430). The method then determines whether there is another x in the range [a, b] (432) and if so, proceeds to step (430) for processing another iteration in the loop. If the loop has processed each x in the range [a, b], then the method includes sending $y_B$ from entity B to entity A (434) and storing $y_B$ for use in authentication (436).

The method may also include comparing $y_B$ with a $y_A$ generated when entity A performs the same calculation disclosed above. If $y_B=y_A$, then the system accepts entity B as authentic. Also as noted above, p is preferably a power of 2 that may be some other value as well. Also as noted above, the encryption scheme used in step (430) may be one of AES, DES, HMAC, a hashing function, the "light" HMAC scheme below or some other known or hereinafter developed encryption scheme.

Another aspect related to FIG. 3 involves defining a set of values $\{a_i\}$ and P as a polynomial representing a sum of $a_i*x_i^i$ over i, where $x_i^i$ means $x_i$ to the power of i. The values $\{a_i\}$ represent the coefficients in the polynomial. As noted above, this P may be used as an alternative $y_A$, $y_B$ pair. The set of values $\{a_i\}$ is provided to each entity A and entity B. Entity A sends entity B a defined set of values $\{x_i\}$ and preferably a p value. The set of values $\{a_i\}$ may be a random set or any other determined set. Entity B computes a result based on the set $\{a_i\}$ and $E(x_i)$, wherein $E(x_i)$ represents an encryption scheme and the multiplication is carried out mod p. For example, the solution involves computing $a_0*E(x_0)+a_1*x_1*E(x_1)+a_2*x_2^2*E(x_2)+\ldots$. The computed result is set equal to $y_B$ and transmitted from entity B to entity A wherein it is stored for use in authentication.

Entity A then generates a $y_A$ by performing the same computation used to generate $y_B$. If $y_B$ equals $y_A$, then entity A accepts entity B as authentic. As discussed above, any encryption or hashing function may be used in the authentication process. The computation of a result based on the set $\{a_i\}$ and $E(x_i)$ may include a sum of $a_i*x_i^i*E(x_i)$ over each value of i or a sum of $a_i*(x_i*E(x_i))^i$ over i. An advantage of this approach is that it can protect the encryption scheme E since an attacker does not have the ability to choose the input. This is referred to as a chosen plaintext attack, and this approach renders it harder to break the scheme. Note that in the generalization approaches above related to the use of polynomials, the granularity is predetermined inasmuch as it depends on the number of coefficients. As an example, the solution to this embodiment is $a_0+a_1*x_1*E(x_1)+a_2*(x_2*E(x_2))^2+\ldots$. The disclosed approach can be used with any classical encryption scheme and can also be used with an HMAC function. Another advantage of the disclosure is that it possible to use a less secure encryption scheme, such as the "light" HMAC scheme disclosed below.

Because of the increased level of security provided in key management as set forth above, a simpler encryption scheme may be applied and maintain the same or better overall level of security. Accordingly, another embodiment of this disclosure discussed next relates to a version of the HMAC function which may be referred to as a "light" HMAC scheme because it is easy to implement and efficient. There are only two basic functions which can be implemented directly or using different approach such as digital signal processing.

First, a function $g_i$ is defined as follows:

$$g_i(x_0,x_1,c)=(((x_0\|x_1+c)^2 XOR\ cst_i XOR(((x_0\|x_1+c)>>16)^2) \bmod 2^{32}.$$

Here, "$\|$" denotes the concatenation operation. Each $x_i$ is preferably 2 bytes but may be represented by a different number of bits as well. Let $G_i$ be defined as:

$$G_i(x_0,x_1,x_2,x_3,c)=[(((x_0\|x_1+c)^2 XOR\ csti_i XOR((x_0\|x_1+c)^2>>32))+(((x_2\|x_3)+c)^2 XOR\ csti_i XOR((x_2\|x_3)+c)^2>>32))]\bmod 2^{32}.$$

When $x_i$ is 2 bytes, the input to $g_i$ is 32 bits in length and the output is 32 bits in length. The input to $G_i$ is 64 bits in length and the output is 32 bits in length, thus providing a compression of the data. The values c, $cst_i$ and $csti_i$ are constant values depending on i. These values are typically stored in a table. The light HMAC scheme disclosed herein is an iterative scheme. One internal round during the key expansion phase of the light HMAC scheme generates output data based on the input data for a particular x. The output is the concatenation $x_0\|x_1\|x_2\|x_3\|x_4\|x_5\|x_6\|x_7$, which in this example is 128 bits. Also, it is noted that the general principles of this scheme may be applicable to other organizations of input data. For example, the bit value of x, split into n number of $x_i$ blocks may also be processed wherein x is a greater or lesser number of bits and n is more or less than eight.

Figure 4C:
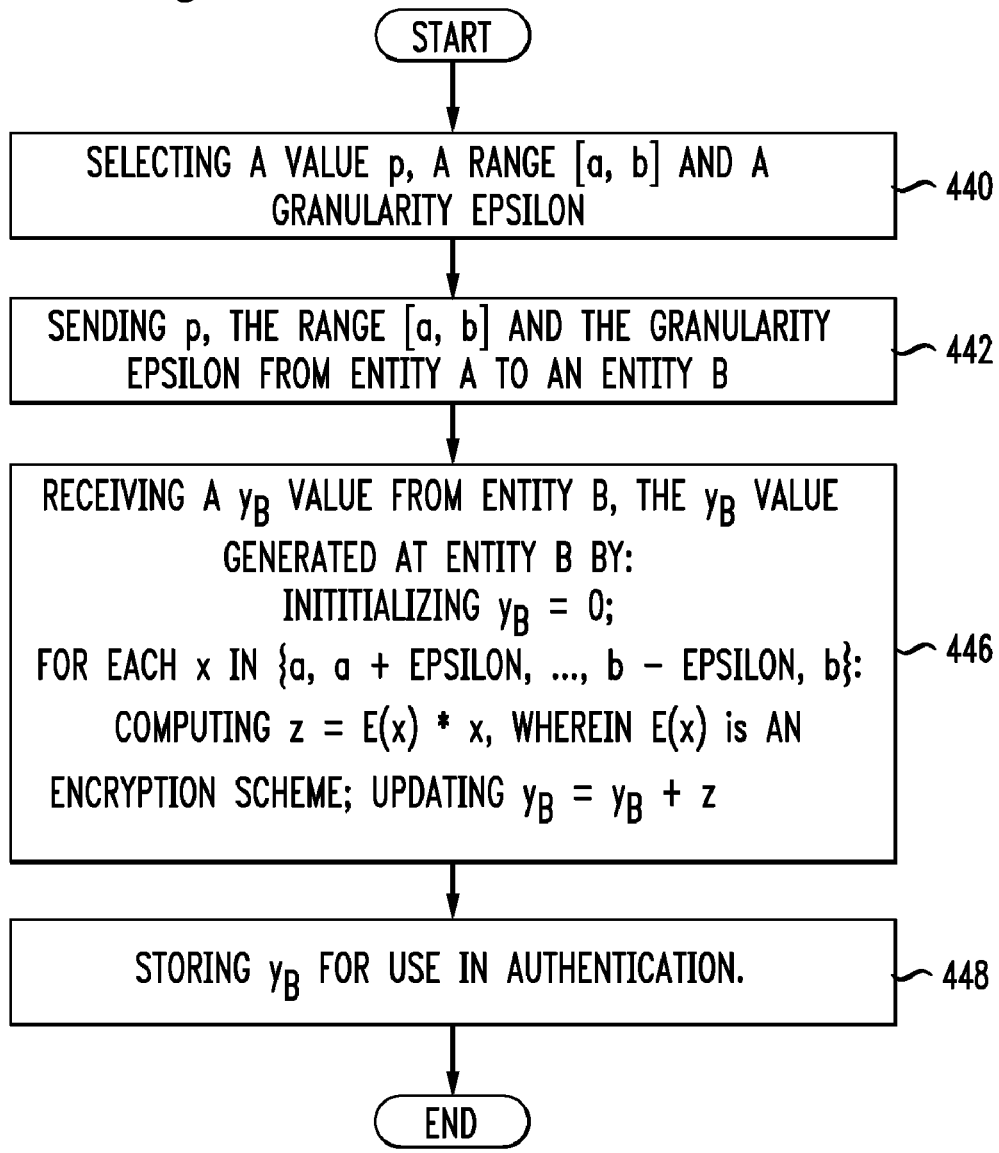
FIG. 4C illustrates yet another method embodiment.

Another aspect of the disclosure relates to a method of authentication that is centric to a particular entity. This is shown in FIG. 4C. In this embodiment, the method is viewed as being performed only in view of entity A or entity B. For the embodiment related to entity A, the method includes, at entity A, selecting a value p, a range [a, b] and a granularity epsilon (440). Entity A sends p, the range [a, b] and the granularity epsilon to an entity B (442). Entity B performs its processing and generates a value $y_B$. Entity A receives $y_B$ from entity B (446) and stores this value for use in authentication (448). The value $y_B$ will be compared to a value $y_A$ that is generated according to a process which involves initializing a $y_A$ value at 0, and for each x in {a, a+epsilon, . . . , b−epsilon, b}, computing z=E(x)*x, wherein E(x) is an encryption scheme (the multiplication is carried out mod p) and updating $y_A=y_A+z$. Entity B performs the same operations in generating $y_B$. Here, entity B initializes $y_B=0$, for each x in {a, a+epsilon, . . . , b−epsilon, b} and computes z=E(x)*x. The function E(x) is an encryption scheme and the multiplication is carried out mod p. Entity B then updates $y_B=y_B+Z$ (446). Therefore, each of entity A and entity B performs the identical calculation, but this embodiment is viewed from the perspective at entity A.

Figure 4D:
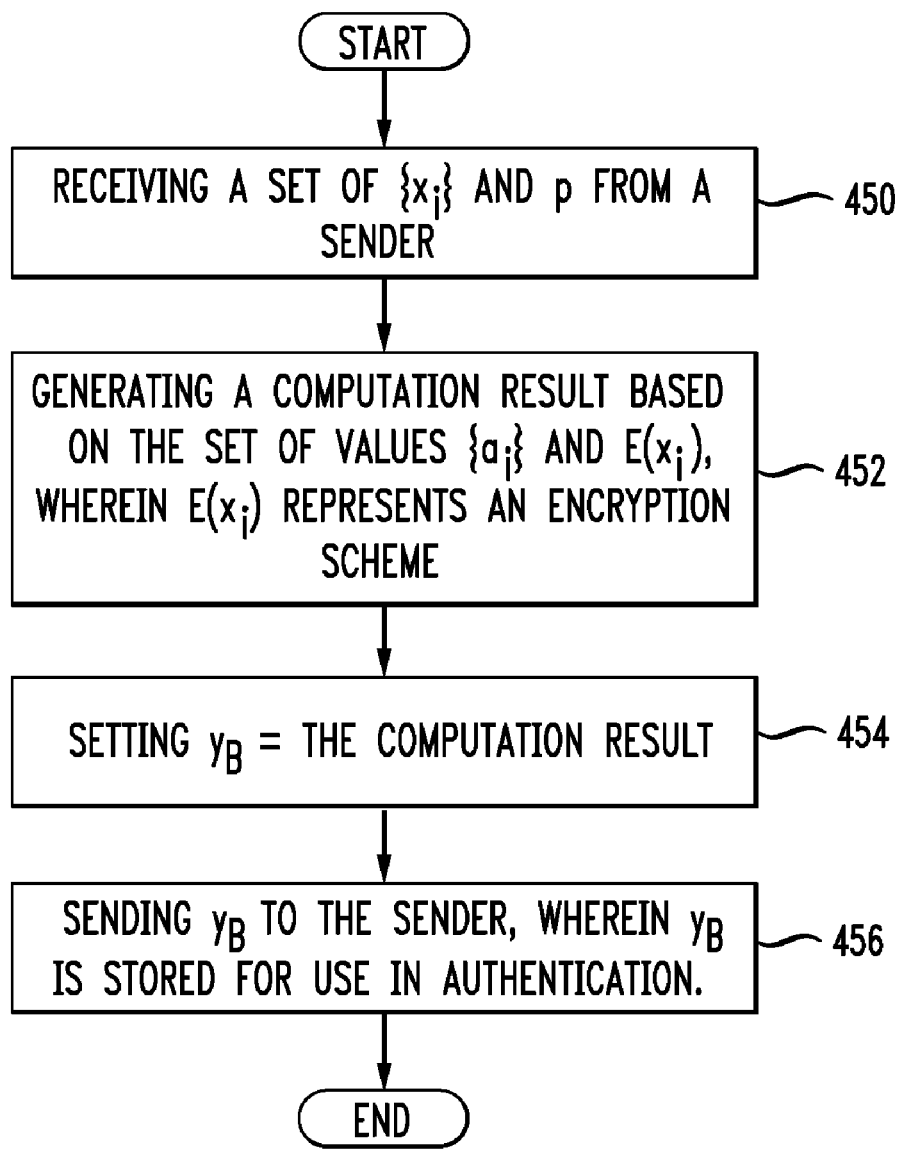
FIG. 4D illustrates yet another method embodiment.

Similarly, another embodiment of the disclosure relates to processing as viewed from entity B. This aspect is illustrated in FIG. 4D. Here, the method of authentication utilizes a predetermined set of values $\{a_i\}$ and a value P defined as the sum of $a_i*x_i^i$ over i, wherein $x_i^i$ is $x_i$ to the power of i. The method comprises, at a receiver, receiving a set of values $\{x_i\}$ and P from a sender (450). The receiver generates a computation result based on the set of values $\{a_i\}$ and $E(x_i)$ wherein $E(x_i)$ represents an encryption scheme and the multiplication is carried out mod p (452). For example, the solution involves computing $a_0*E(x_0)+a_1*x_1*E(x_1)+a_2*x_2^2*E(x_2)+\ldots$. The receiver sets $y_B$ to the computation result (454) and sends $y_B$ to the sender wherein $y_B$ is stored for use in authentication (456).

In any embodiment disclosed herein, variations may be made similar to those set forth above wherein particular processing occurs or is viewed from the standpoint of an entity A or an entity B, or a receiver and a sender. Therefore, other embodiments may be generated based on the disclosure herein along these lines.

Figure 5A:
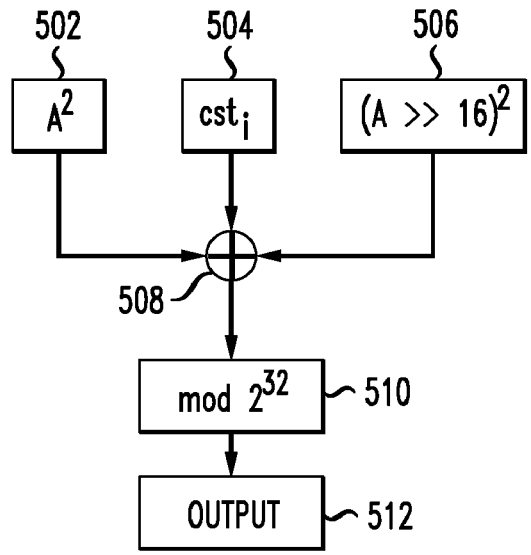
FIGS. 5A and 5B illustrate various algorithms used in a process of key expansion.

FIG. 5A illustrates graphically the $g_i$ equation. Block 504 illustrates an $A^2$ value. Here, A equals $(((x_0 \| x_1) + c)$. Block 504 represents the $cst_i$ and block 506 represents the value of $(A \gg 16)^2$ wherein ">>" represents a right shift operation of 16 bits. The output of each of these blocks is XORed as shown in block 508. XOR is a bitwise exclusive OR operation that takes patterns of equal length and performs a logical XOR operation on each pair of corresponding bits. The result in each position is 1 if the two bits are different and 0 if they are the same. The operation is carried out mod $2^{32}$. This operation finds the remainder of division of one number by another number and provides the output as shown in block 512.

Figure 5B:
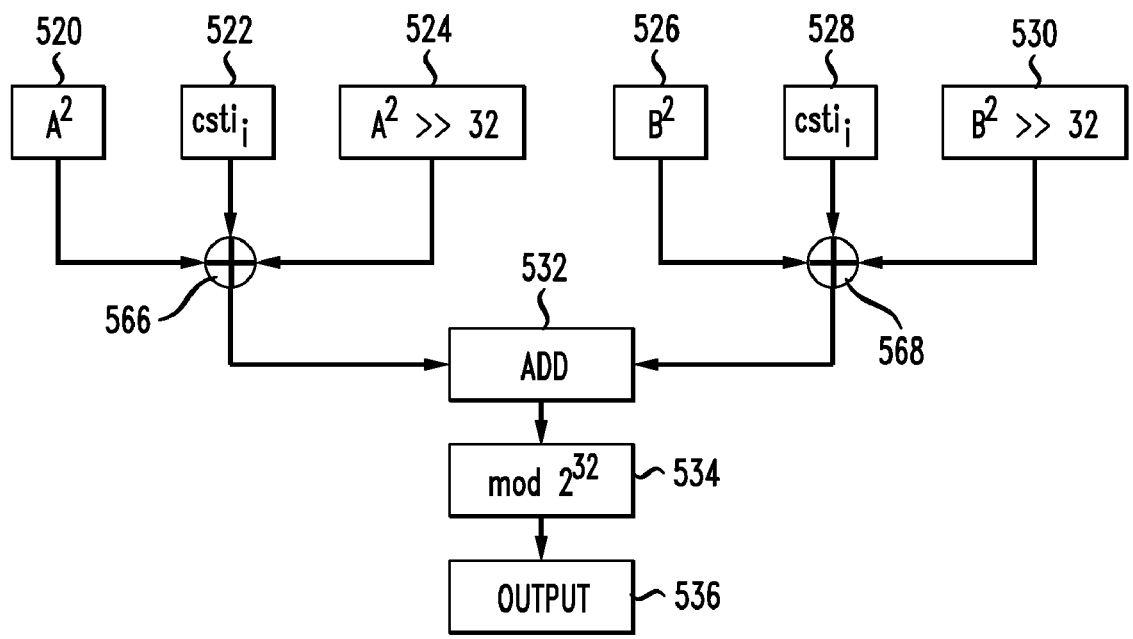

FIG. 5B graphically illustrates the function $G_i$. Block 520 squares the A value (defined above), block 522 provides the constant $csti_i$, and block 524 squares the A value and performs the right shift operation of 32 bits. Thus blocks 520, 522 and 524 provide the input to an XOR operator 566 in a manner similar to that discussed in FIG. 5A. In block 526, B is defined as $(((x_2 \| x_3) + c)$. The $B^2$ in block 526, a constant value $csti_i$ in block 528 and $B^2 \gg 32$ in block 530 are XORed together 568 to produce the output. This output is added in block 532 with the output from XOR operation 566 mod $2^{32}$ in block 534 to produce the output as shown in block 536.

Figure 5C:
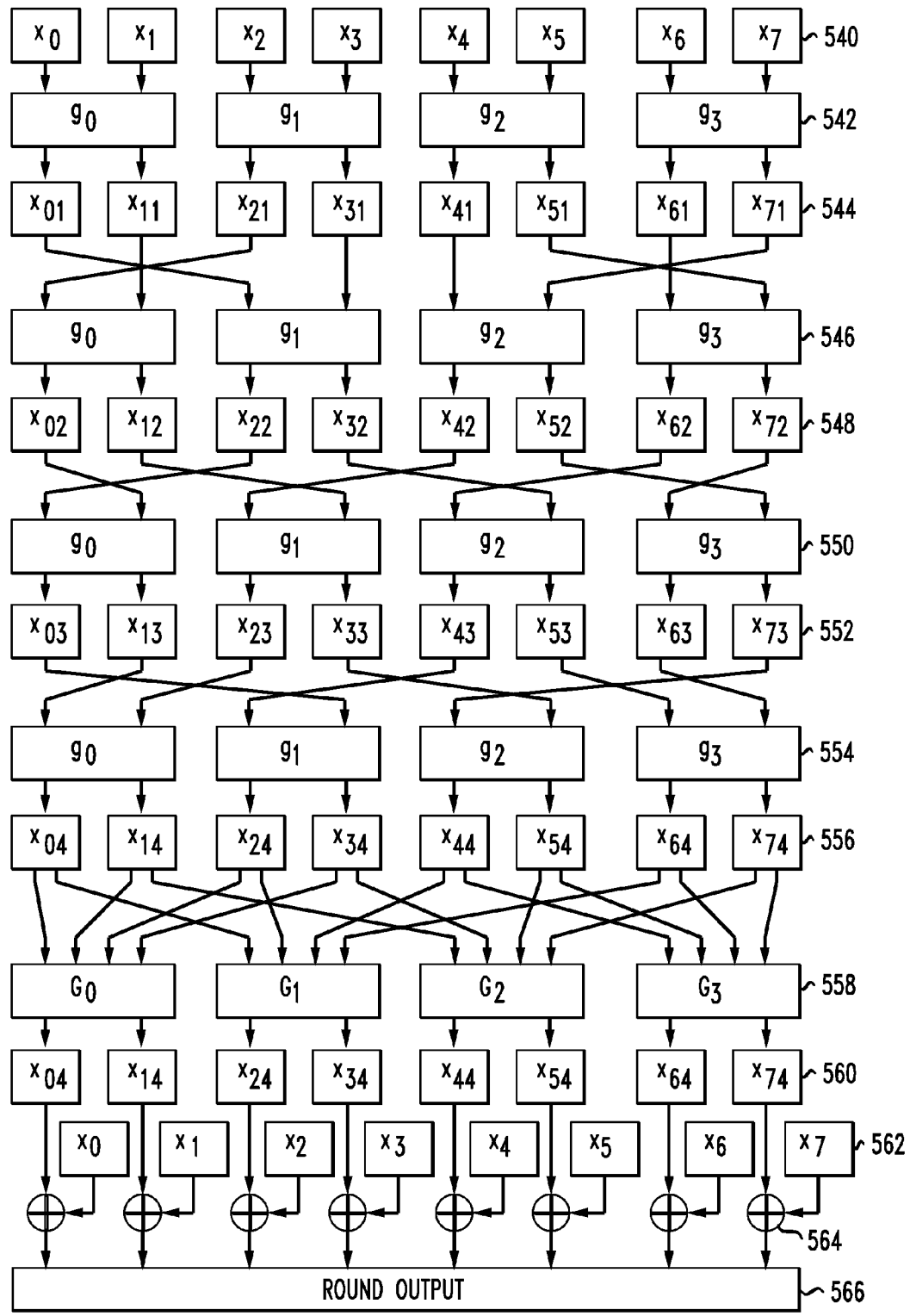
FIG. 5C graphically illustrates a process of generating round keys according to an aspect of the disclosure.

FIG. 5C illustrates one round of key expansion used in the light HMAC scheme. Row 540 illustrates the input x divided in to n number of blocks. In this example, n equals 8. As noted above, in this example, each $x_i$ block is 16 bits. Thus, in row 542 each function $g_i$ receives and processes two blocks of data. Each $g_i$ function receives 32 bits of input data and outputs 32 bits of data to row 544. The various groupings of blocks are then again processed in row 546 by another set of $g_i$ functions, and again outputs 32 bits of data in row 548. This process occurs again, where different sets of data are processed by the $g_i$ functions in step 550 and again provides output in row 552. Again the different inputs are provided to the $g_i$ functions in row 554 and output in row 556. In row 558 each $G_i$ function receives 64 bits of input and compresses the input 64 input bits to 32 bits, output in row 560 as shown. Each block of output in row 560 is XORed in row 564 using the original $x_i$ blocks from row 562 to generate the round output in row 566. The process generates a round key which is stored for later use in the HMAC algorithm.

Figure 5D:
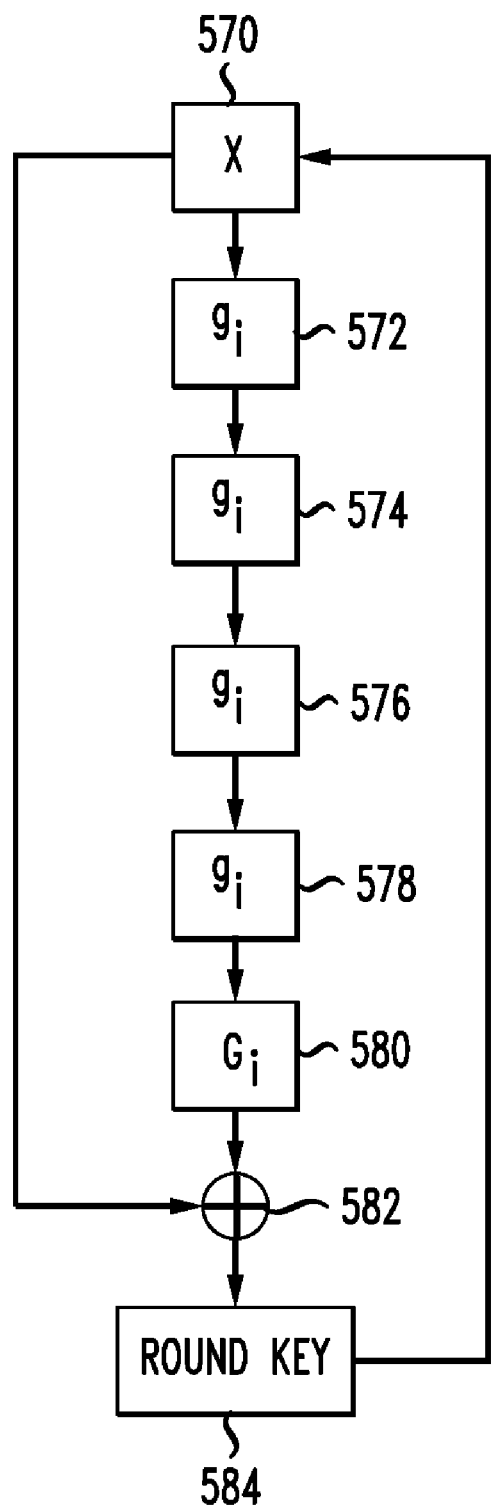
FIG. 5D illustrates a flow diagram of the more detailed diagram of FIG. 5C.

FIG. 5D provides a simpler view of this key expansion algorithm. Block 570 represents the initial input block which is split into $x_i$ parts and used as input to $g_i$ in step 572. Here, $g_i$ represents the process for each of $g_0$, $g_1$, $g_2$, and $g_3$. The blocks 574, 5756 and 578 represent multiple applications of the output from one step as the input to another step. Block 580 represents the processing by $G_i$ which output is then XORed with the original $x_i$ from step 570 at 582. FIG. 5D next illustrates that the round key generated in step 584 is used to seed the next round to key expansion. Variations on this approach may be used as well. For example, while four separate processing occurrences of the $g_i$ function are disclosed, the key expansion scheme may increase or decrease the number of times the $g_i$ processed is utilized. Similarly, there may be instances where multiple uses of the $G_i$ process are used as an alternate approach. Typically, the input to the light HMAC scheme may be larger and the output size is fixed.

Figure 6:
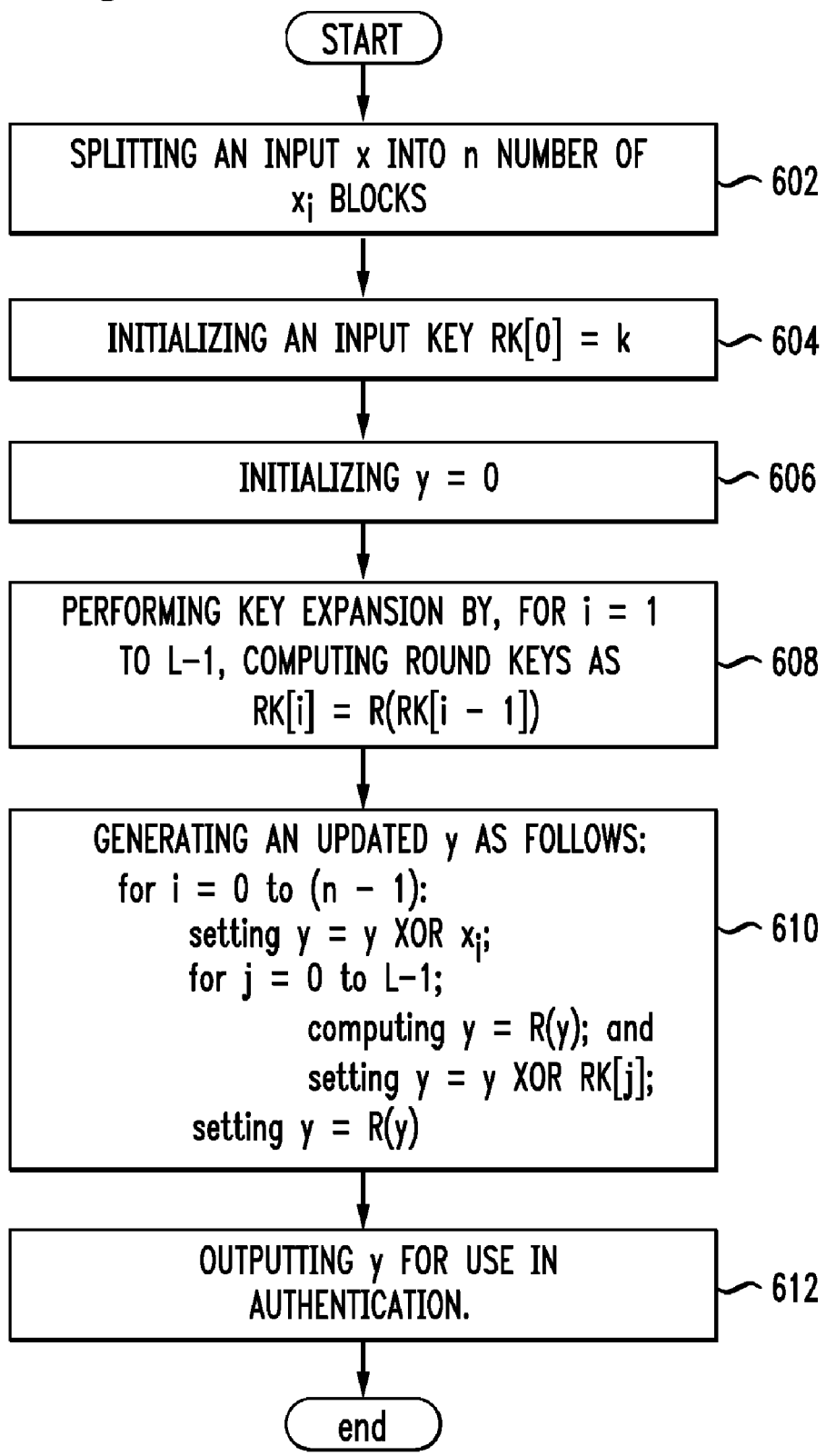
FIG. 6 illustrates yet another method embodiment related to a light HMAC scheme.

FIG. 6 illustrates an exemplary method aspect of the disclosure. Here, the input x is split into n number of $x_i$ blocks (602) and the system initializes an input key RK[0] as a key k (604). This is typically an input key that is used for the HMAC process as is known in the art. y is initialized as 0 (606) and the steps involve performing key expansion by, for i=1 to L−1, computing round keys RK[i]=R(RK[i−1]) (608). Next, the system generates an updated y in an iterative fashion as follows:

```
for i = 0 to (n − 1):
    setting y = y XOR x_i;
    for j = 0 to L − 1:
        computing y = R(y); and
        setting y = y XOR RK[j].
```

Finally, y is set equal to R(y) (610). The y is output for use in authentication (612).

Figure 7:
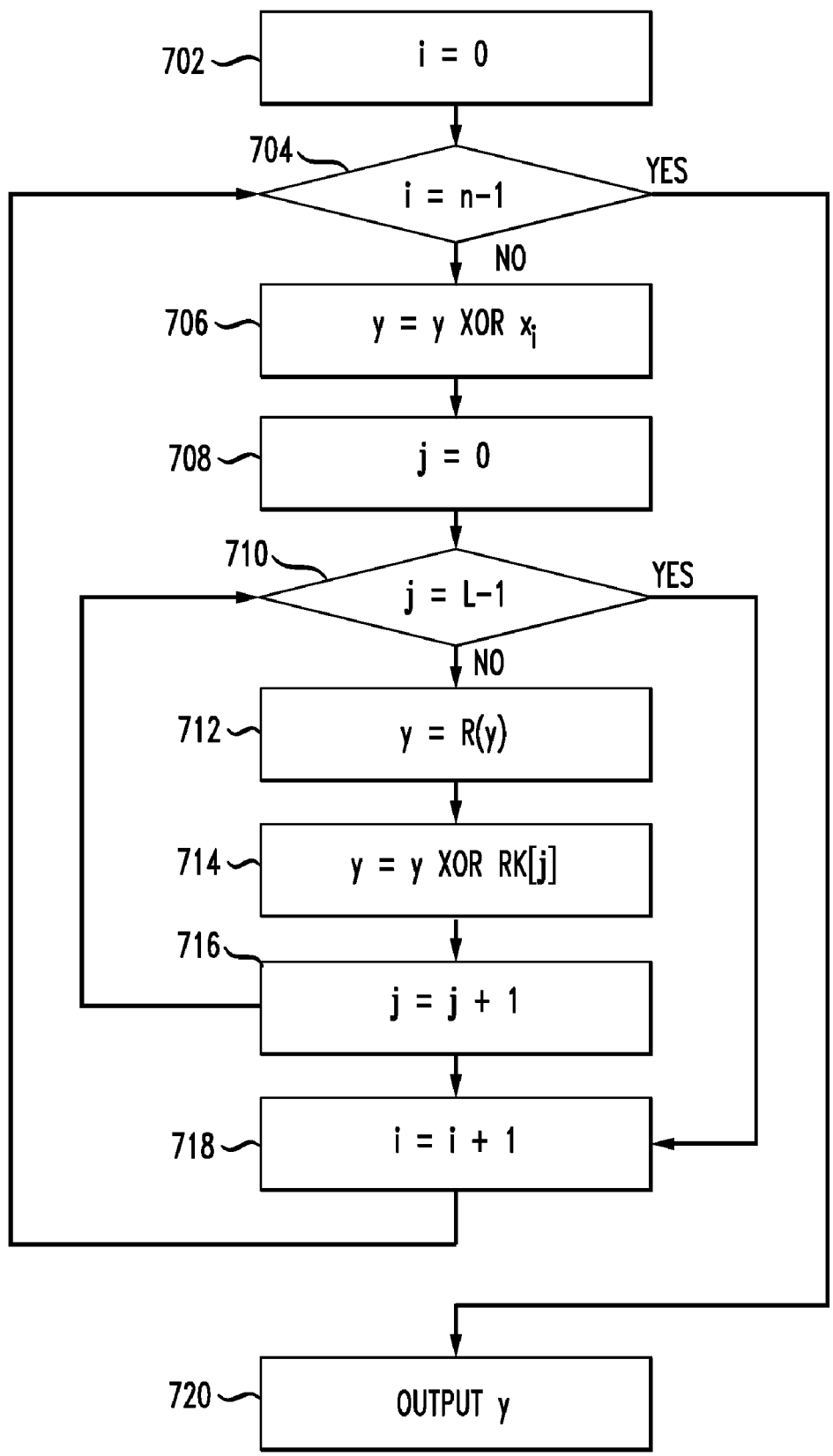
FIG. 7 illustrates an example flow diagram of an algorithm according to the light HMAC scheme.

FIG. 7 illustrates in more detail the step of generating the updated y from step (610) of FIG. 6. The value i is initialized as zero (702) and the system sets y=y XOR $x_i$ (704). The value j is then initialized as zero (706) and y is set to R(y) (708). The value y is calculated to equal y XOR RK[j] (710) and j is compared with the value L (712). If j does not equal L−1, then j is incremented to j+1 (714) and the system returns to step (708) with an incremented j. When j=L−1, the system assigns y=R(y) (716) and next compares i to (n−1) (718). If i does not equal (n−1) (718), then the system increments i as i+1 (720) and returns to step (704). If i does equal (n−1) (718), each $x_i$ block has been processed and the system outputs y (722) for use in authentication.

Therefore, as disclosed above, the process of performing key expansion generates a table of round keys for a predetermined number of rounds L. The key expansion function includes, for each key, performing a function $g_i$ that concatenates members of a first set of bits and XORs the concatenated members with a constant to generate a second set of bits. The function $G_i$ compresses the second set of bits from $g_i$ to generate the compressed output. The compressed output is XORed with the first set of bits to generate a respective round key. The iterative value of y is updated by using the table of round keys in an iterative application of an encryption scheme such as HMAC. Of course, the value y is used for authentication. This approach may then be practiced on different entities to generate the different values y for the different entities. These values can then be compared for authentication purposes as discussed above.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
communicating, from an authenticating device to a client device, a mod value p and a range $[\alpha,\beta]$, wherein the range $[\alpha,\beta]$ comprises a series of values with a start value of $\alpha$ and an ending value of $\beta$, each value in the range having a size defined by a granularity $\epsilon$, wherein $\alpha$ is greater than 0, wherein $\beta$ is greater than 0, and wherein the granularity $\epsilon$ is greater than 1;
receiving a check value $y_B$, where $y_B$ is defined by steps comprising:
initializing $y_B=0$;
for each value in the range $[\alpha,\beta]$, beginning with a current value $x_B$ equal to $\alpha$ and increasing by $\epsilon$:
calculating an intermediate check value $z_B$, where $z_B$ for each $x_B$ in the range $[\alpha,\beta]$ equals the current value $x_B$ multiplied by an encrypted current value $x_B$, shown as: $z_B=E(x_B)*x_B$, wherein the encrypted current value $x_B$ is encrypted according to at least one of AES, DES and HMAC;
performing a mod function on $z_B$ using the mod value p, shown as: $z_B=z_B$ mod p; and
updating the check value $y_B$ by adding the intermediate check value to a previous value of the check value, shown as: $y_B=y_B+z_B$;
comparing the check value $y_B$ to an authentication value $y_A$; and
upon the authenticating device determining that $y_B=y_A$, accepting the client device as authentic.

2. The method of claim 1, wherein $y_A$ is defined by steps comprising:
initializing $y_A=0$; and
for each value in the range $[\alpha,\beta]$, beginning with the current value $x_A$ equal to $\alpha$ and increasing by $\epsilon$:
calculating an intermediate authentication value $z_A$, where $z_A$ for each $x_A$ in the range $[\alpha,\beta]$ equals the current value $x_A$ multiplied by an encrypted current value $x_A$, shown as: $z_A=E(x_A)*x_A$;
performing a mod function on $z_A$ using mod value p, shown as: $z_A=z_A$ mod p; and
updating the authentication value $y_A$ by adding the intermediate authentication value to a previous value of the check value, shown as: $y_A=y_A+z_A$.

3. The method of claim 1, wherein p is a power of 2.

4. A method comprising:
receiving, at a client device, a mod value p and a range $[\alpha,\beta]$ from an authenticating device, wherein the range $[\alpha,\beta]$ comprises a series of values with a start value of $\alpha$ and an ending value of $\beta$, and each value in the range having a size defined by a granularity $\epsilon$, wherein $\alpha$ is greater than 0, wherein $\beta$ is greater than 0, and wherein the granularity $\epsilon$ is greater than 1;
generating a check value $y_B$, where $y_B$ is defined by steps comprising:
initializing $y_B=0$;
for each value in the range $[\alpha,\beta]$, beginning with a current value $x_B$ equal to $\alpha$ and increasing by $\epsilon$:
calculating an intermediate check value $z_B$, where $z_B$ for each $x_B$ in the range $[\alpha,\beta]$ equals the current value $x_B$ multiplied by an encrypted current value $x_B$, shown as: $z_B=E(x_B)*x_B$, wherein the encrypted current value $x_B$ is encrypted according to at least one of AES, DES and HMAC;
performing a mod function on $z_B$ using the mod value p, shown as: $z_B=z_B$ mod p; and
updating the check value $y_B$ by adding the intermediate check value to a previous value of the check value, shown as: $y_B=y_B+z_B$; and
transmitting the check value $y_B$, in response to receiving the mod value p and the range $[\alpha,\beta]$, to the authenticating device that authenticates the client device based on the check value $y_B$.

5. The method of claim 4, wherein p is a power of 2.

6. A method comprising:
communicating, from an authenticating device to a client device, a mod value p, a set of numbers $\{a_i\}$, and a range $[\alpha,\beta]$, wherein the range $[\alpha,\beta]$ comprises a series of values with a start value of $\alpha$ and an ending value of $\beta$, each value in the range having a size defined by a granularity $\epsilon$, and the set of numbers $\{a_i\}$ comprises individual numbers equal to or greater than the range $[\alpha,\beta]$ in terms of quantity, wherein $\alpha$ is greater than 0, wherein $\beta$ is greater than 0, and wherein the granularity $\epsilon$ is greater than 1;
receiving, from the client device, a check value $y_B$, where $y_B$ is generated by steps comprising:
initializing $y_B$ to 0;
for each value in the range $[\alpha,\beta]$, beginning with a current value $x_B$ equal to $\alpha$ and increasing by $\epsilon$:
calculating an intermediate check value $z_B$, where $z_B$ for each $x_B$ in the range $[\alpha,\beta]$ equals the current value $x_B$ multiplied by an encrypted current value $x_B$ and a respective one of the set of numbers $\{a_i\}$, shown as: $z_B=E(x_B)*x_B*a_x$, where $a_x$ equals a number in the set $\{a_i\}$ corresponding to the current value $x_B$, wherein the encrypted current value $x_B$ is encrypted according to at least one of AES, DES and HMAC;

performing a mod function on $z_B$ using the mod value p, shown as: $z_B = z_B \mod p$; and updating the check value $y_B$ by adding the intermediate check value to a previous value of the check value, shown as: $y_B = y_B + z_B$; and upon the authenticating device determining that $y_B$ is equal to an authentication value $y_A$, accepting the client device as authentic.

7. The method of claim 6, wherein the set of numbers $\{a_i\}$ corresponds to coefficients of a polynomial.

8. The method of claim 6, wherein p is a power of 2.

9. The method of claim 1, wherein the series of values corresponds to coefficients of a polynomial.

10. The method of claim 4, wherein the series of values corresponds to coefficients of a polynomial.

11. The method of claim 4, wherein the granularity $\epsilon$ is generated locally at the client device.

* * * * *